United States Patent
Murayama et al.

(10) Patent No.: US 7,041,395 B2
(45) Date of Patent: May 9, 2006

(54) MAGNETIC RECORDING MEDIUM

(75) Inventors: Yuichiro Murayama, Kanagawa (JP); Hiroshi Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/808,468

(22) Filed: Mar. 25, 2004

(65) Prior Publication Data
US 2004/0191465 A1 Sep. 30, 2004

(30) Foreign Application Priority Data
Mar. 25, 2003 (JP) ............... 2003-083434

(51) Int. Cl.
*G11B 5/738* (2006.01)
(52) U.S. Cl. .................. 428/840.5; 428/840.1
(58) Field of Classification Search ............... 428/141, 428/216, 336, 694 BU, 694 BS, 694 BC, 428/840.1, 840.5
See application file for complete search history.

(56) References Cited

U.S. PATENT DOCUMENTS

| | | | |
|---|---|---|---|
| 4,596,747 A | * | 6/1986 | Nishimatsu et al. .. 428/694 BC |
| 4,717,623 A | | 1/1988 | Brown et al. |
| 4,746,558 A | * | 5/1988 | Shimozawa et al. ........ 428/141 |
| 4,772,522 A | | 9/1988 | Kubota et al. |
| 5,639,546 A | * | 6/1997 | Bilkadi ....................... 428/331 |
| 6,074,724 A | | 6/2000 | Inaba et al. |

FOREIGN PATENT DOCUMENTS

JP 60-079525 A 5/1985

OTHER PUBLICATIONS

European Search Report dated Jun. 25, 2004.

\* cited by examiner

*Primary Examiner*—Stevan A. Resan
(74) *Attorney, Agent, or Firm*—Sughrue Mion, PLLC

(57) ABSTRACT

A magnetic recording medium is provided which includes, in order on a non-magnetic support, a radiation-cured layer formed by curing a layer containing a radiation curing compound by exposure to radiation, a middle layer having a non-magnetic powder dispersed in a binder (1), the middle layer being provided as necessary, and at least one magnetic layer having a ferromagnetic fine powder dispersed in a binder (2). The radiation curing compound has a hydroxyl group and a radiation curing functional group in the molecule, and the number of micro projections on the surface of the magnetic layer having a height of 10 to 20 nm measured by atomic force microscopy (AFM) is 5 to 1,000/100 $(\mu m)^2$.

15 Claims, No Drawings

MAGNETIC RECORDING MEDIUM

BACKGROUND OF THE INVENTION

1. Field of the Invention

The present invention relates to a magnetic recording medium having at least one magnetic layer provided over a non-magnetic support.

2. Description of the Related Art

Magnetic recording media are widely used as recording tapes, video tapes, flexible disks, etc. In the magnetic recording media, a magnetic layer in which a ferromagnetic fine powder is dispersed in a binder is layered on a non-magnetic support. The magnetic recording media are required to have high levels of various properties such as electromagnetic conversion characteristics, transport durability, and transport performance. That is, audio tapes for recording and playing back music are required to have high playback performance of original sounds, and video tapes are required to have excellent electromagnetic conversion characteristics such as playback performance of original images. At the same time as being required to have excellent electromagnetic conversion characteristics as described above, the magnetic recording media are required to have good transport durability.

However, since a magnetic layer obtained by coating a support with a coating solution in which a ferromagnetic fine powder has been dispersed in a binder has a high degree of packing of the ferromagnetic powder and a low value for elongation at break and is brittle, if the magnetic layer is formed without providing an undercoat layer, it might be easily destroyed by the application of mechanical force and peeled off from the support. An undercoat layer is therefore provided on the support so as to make the magnetic layer adhere strongly to the support.

For example, it is known that a compound having a functional group that is cured by radiation such as an electron beam, that is, a radiation curing compound, is used to form an undercoat layer.

For example, it has been proposed that a magnetic recording medium is prepared by forming an undercoat layer using a difunctional aliphatic compound as the radiation curing compound (ref. JP-B-5-57647 (JP-B denotes a Japanese examined patent application publication)). These aliphatic compounds give a cured coating having a glass transition temperature of at most the order of 40° C., and there might be a problem with tackiness during a coating step after the undercoat layer is applied. Furthermore, since such a smooth magnetic layer increases the contact surface between the surface of the magnetic layer and a head, the head is easily contaminated during repetitive sliding.

BRIEF SUMMARY OF THE INVENTION

It is an object of the present invention to provide a magnetic recording medium having excellent transport durability, coating smoothness, electromagnetic conversion characteristics, and long-term storability.

The object of the present invention is achieved by the following means.

A magnetic recording medium comprising, in order on a non-magnetic support, a radiation-cured layer formed by curing a layer containing a radiation curing compound by exposure to radiation, a middle layer having a non-magnetic powder dispersed in a binder (1), the middle layer being provided as necessary, and at least one magnetic layer having a ferromagnetic fine powder dispersed in a binder (2), the radiation curing compound having a hydroxyl group and a radiation curing functional group in the molecule, and the magnetic layer having on the surface thereof a number of micro projections having a height of 10 to 20 nm measured by atomic force microscopy (AFM) of 5 to 1,000/100 $(\mu m)^2$.

The above-mentioned magnetic recording medium can have two layer structures as described below, depending on whether or not the middle layer is present.

That is, when there is no middle layer, the magnetic recording medium comprises a non-magnetic support and, in order on the support, a radiation-cured layer formed by curing a layer containing a radiation curing compound by exposure to radiation, and at least one magnetic layer having a ferromagnetic fine powder and a binder (2) dispersed therein, the radiation curing compound having a hydroxyl group and a radiation curing functional group in the molecule, and the magnetic layer having on the surface thereof a number of micro projections having a height of 10 to 20 nm measured by atomic force microscopy (AFM) of 5 to 1,000/100 $(\mu m)^2$.

On the other hand, when there is a middle layer, the magnetic recording medium comprises a non-magnetic support and, in order on the support, a radiation-cured layer formed by curing a layer containing a radiation curing compound by exposure to radiation, a middle layer containing a non-magnetic powder and a binder (1), and at least one magnetic layer having a ferromagnetic fine powder and a binder (2) dispersed therein, the radiation curing compound having a hydroxyl group and a radiation curing functional group in the molecule, and the magnetic layer having on the surface thereof a number of micro projections having a height of 10 to 20 nm measured by atomic force microscopy (AFM) of 5 to 1,000/100 $(\mu m)^2$.

DETAILED DESCRIPTION OF THE INVENTION

In the magnetic recording medium of the present invention, projections on the surface of polyethylene terephthalate, polyethylene naphthalate, polyamide, etc. supports, which are generally known as supports for magnetic recording media, can be buried by providing, on a non-magnetic support, a radiation-cured layer, a middle layer, and a magnetic layer, the radiation-cured layer being provided by coating the non-magnetic support with a radiation curing compound having a hydroxyl group and a radiation curing functional group and then curing it by exposure to radiation. In particular, micro projections of the middle layer and the magnetic layer originating from the projections of the support, which are thought to have a large effect on the electromagnetic conversion characteristics, can be reduced, thereby giving an extremely smooth magnetic recording medium, and enabling excellent electromagnetic conversion characteristics to be achieved. It can be expected that, since the viscosity of the radiation curing compound is comparatively low, its leveling properties during coating will be excellent, and the effect in burying projections on the surface of the support will be large.

Furthermore, since a compound having a hydroxyl group, which has a high polarity, is used as a compound for forming the radiation-cured layer, its adhesion to the middle layer or the magnetic layer is improved, thereby suppressing loss of the coating due to repetitive transport.

The radiation curing functional group of the radiation curing compound of the present invention is preferably an ethylenically unsaturated group, and an acryloyl group or a methacryloyl group is more preferable. The acryloyl group is particularly preferable.

Since the compound forming the radiation-cured layer has an acryloyl group or a methacryloyl group, the radiation-cured layer can form a cross-linked structure, thereby reducing faults such as sticking to a path roller, etc. in a coating step and suppressing faults such as an uncured component precipitating on the surface of a coating during long-term storage. In particular, when there are two or more acryloyl groups or methacryloyl groups in the molecule, the cross-linking density is high and the above-mentioned effects are large.

Furthermore, when a compound having a cyclic structure, an ether group, and two or more radiation curing functional groups in the molecule is used in combination, high smoothness and durability can be achieved. It is surmised that this effect is obtained because degradation in smoothness and in adhesion to the support due to the coating shrinking during curing can be suppressed.

1. Radiation-cured Layer (Radiation Curing Compound)

It is essential that the radiation curing compound used in the radiation-cured layer of the present invention includes a compound having a hydroxyl group and a radiation curing functional group in the molecule. The number of hydroxyl groups and the number of radiation curing functional groups in the molecule are not particularly limited.

The number of hydroxyl groups is preferably 1 to 3. In this range, good solubility can be obtained, and coating repulsion is not caused.

The radiation curing compound preferably has 2 to 5 acryloyl groups or methacryloyl groups in the molecule. When 2 to 5 acryloyl groups or methacryloyl groups are present in the molecule, a coating of the radiation-cured layer is less tacky, has a low level of curing shrinkage, and gives adequate smoothness.

That is, a radiation curing compound (1) having 1 to 3 hydroxyl groups and 2 to 5 acryloyl groups or methacryloyl groups in the molecule can be preferably used.

With regard to the radiation curing compound (1), those obtained by reacting a polyfunctional alcohol with acrylic acid or methacrylic acid can be used.

Specific examples thereof include glycerol diacrylate, glycerol dimethacrylate, propylene glycol diglycidyl ether diacrylate, propylene glycol diglycidyl ether dimethacrylate, glycerol diglycidyl ether diacrylate, glycerol diglycidyl ether dimethacrylate, pentaerythritol diacrylate, pentaerythritol triacrylate, pentaerythritol dimethacrylate, pentaerythritol trimethacrylate, trimethylolpropane diacrylate, trimethylolpropane dimethacrylate, dipentaerythritol diacrylate, dipentaerythritol triacrylate, dipentaerythritol tetraacrylate, dipentaerythritol pentaacrylate, dipentaerythritol dimethacrylate, dipentaerythritol trimethacrylate, dipentaerythritol tetramethacrylate, dipentaerythritol pentamethacrylate, ditrimethylolpropane diacrylate, ditrimethylolpropane triacrylate, ditrimethylolpropane dimethacrylate, and ditrimethylolpropane trimethacrylate.

Among these, glycerol diacrylate, propylene glycol diglycidyl ether diacrylate, pentaerythritol triacrylate, pentaerythritol trimethacrylate, dipentaerythritol pentaacrylate, and glycerol diglycidyl ether diacrylate are preferable.

Furthermore, the radiation curing compound of the present invention is preferably used in combination with a radiation curing compound (2) having a cyclic structure, an ether group, and at least two radiation curing functional groups in the molecule.

The radiation curing compound (2) preferably has no hydroxyl group.

As the radiation curing compound (2) that can be used, there are those obtained by reacting acrylic acid or methacrylic acid with a di- or higher-functional alcohol having a cyclic ether skeleton, or with a di- or higher-functional alcohol formed by adding ethylene oxide or propylene oxide to a compound having a cyclic structure.

Specific examples of the compound obtained by reacting acrylic acid or methacrylic acid with a di- or higher-functional alcohol having a cyclic ether skeleton include tetrahydrofurandimethanol diacrylate, tetrahydropyrandimethanol diacrylate, 1,3-dioxolane-2-ethanol-5-ethyl-5-hydroxymethyl-β, β-dimethyl diacrylate, 3,9-bis(1,1-dimethyl-2-hydroxyethyl)-2,4,8,10-tetraoxaspiro[5.5]undecane diacrylate, 5-ethyl-2-(2-hydroxy-1,1-dimethylethyl)-5-(hydroxymethyl)-1,3-dioxane diacrylate, tetrahydrofurandimethanol dimethacrylate, tetrahydropyrandimethanol dimethacrylate, 1,3-dioxolane-2-ethanol-5-ethyl-5-hydroxymethyl-β,β-dimethyl dimethacrylate, 3,9-bis(1,1-dimethyl-2-hydroxyethyl)-2,4,8,10-tetraoxaspiro[5.5]undecane dimethacrylate, and 5-ethyl-2-(2-hydroxy-1,1-dimethylethyl)-5-(hydroxymethyl)-1,3-dioxane dimethacrylate.

Among these, 5-ethyl-2-(2-hydroxy-1,1-dimethylethyl)-5-(hydroxymethyl)-1,3-dioxane diacrylate, tetrahydrofurandimethanol diacrylate, and 3,9-bis(1,1-dimethyl-2-hydroxyethyl)-2,4,8,10-tetraoxaspiro[5.5]undecane diacrylate are preferable.

Specific examples of the compound obtained by reacting acrylic acid or methacrylic acid with a di- or higher-functional alcohol formed by adding ethylene oxide or propylene oxide to a compound having a cyclic structure include cyclohexanedimethanol ethylene oxide adduct diacrylate, bisphenol A ethylene oxide adduct diacrylate, hydrogenated bisphenol A ethylene oxide adduct diacrylate, hydroxybiphenyl ethylene oxide adduct diacrylate, bisphenol S ethylene oxide adduct diacrylate, hydrogenated bisphenol S ethylene oxide adduct diacrylate, bisphenol F ethylene oxide adduct diacrylate, hydrogenated bisphenol F ethylene oxide adduct diacrylate, bisphenol P ethylene oxide adduct diacrylate, hydrogenated bisphenol P ethylene oxide adduct diacrylate, diphenyl bisphenol A ethylene oxide adduct diacrylate, diphenyl bisphenol S ethylene oxide adduct diacrylate, diphenyl bisphenol F ethylene oxide adduct diacrylate, 5,5"-(1-methylethylidene)bis[(1,1'-bicyclohexyl)-2-ol] ethylene oxide adduct diacrylate, 4,4'-(1-methylethylidene)bis(2-methylcyclohexanol) ethylene oxide adduct diacrylate, 5,5"-cyclohexylidenebis[(1,1'-bicyclohexyl)-2-ol] ethylene oxide adduct diacrylate, 5,5'-cyclohexylmethylenebis[(1,1'-bicyclohexyl)-2-ol] ethylene oxide adduct diacrylate;

cyclohexanedimethanol propylene oxide adduct diacrylate, bisphenol A propylene oxide adduct diacrylate, hydrogenated bisphenol A propylene oxide adduct diacrylate, hydroxy biphenyl propylene oxide adduct diacrylate, bisphenol S propylene oxide adduct diacrylate, hydrogenated bisphenol S propylene oxide adduct diacrylate, bisphenol F propylene oxide adduct diacrylate, hydrogenated bisphenol F propylene oxide adduct diacrylate, bisphenol P propylene oxide adduct diacrylate, hydrogenated bisphenol P propylene oxide adduct diacrylate, diphenyl bisphenol A propylene oxide adduct diacrylate, diphenyl bisphenol S propylene oxide adduct diacrylate, diphenyl bisphenol F propylene oxide adduct diacrylate, 5,5'-(1- methylethylidene)bis[ (1,1'-bicyclohexyl)-2-ol] propylene oxide adduct diacrylate, 4,4'-(1-methylethylidene)bis(2-methylcyclohexanol) propylene oxide adduct diacrylate, 5,5"-cyclohexylidenebis[(1,1'-bicyclohexyl)-2-ol] propylene oxide adduct diacrylate, 5,5"-cyclohexylmethylenebis[(1,1'-bicyclohexyl)-2-ol] propylene oxide adduct diacrylate;

cyclohexanedimethanol ethylene oxide adduct dimethacrylate, bisphenol A ethylene oxide adduct dimethacrylate, hydrogenated bisphenol A ethylene oxide adduct dimethacrylate, hydroxy biphenyl ethylene oxide adduct dimethacrylate, bisphenol S ethylene oxide adduct dimethacrylate, hydrogenated bisphenol S ethylene oxide adduct dimethacrylate, bisphenol F ethylene oxide adduct dimethacrylate, hydrogenated bisphenol F ethylene oxide adduct dimethacrylate, bisphenol P ethylene oxide adduct dimethacrylate, hydrogenated bisphenol P ethylene oxide adduct dimethacrylate, diphenyl bisphenol A ethylene oxide adduct dimethacrylate, diphenyl bisphenol S ethylene oxide adduct dimethacrylate, diphenyl bisphenol F ethylene oxide adduct dimethacrylate, 5,5"-(1-methylethylidene)bis[(1,1'-bicyclohexyl)-2-ol] ethylene oxide adduct dimethacrylate, 4,4'-(1-methylethylidene)bis(2-methylcyclohexanol) ethylene oxide adduct dimethacrylate, 5,5"-cyclohexylidenebis[(1,1'-bicyclohexyl)-2-ol] ethylene oxide adduct dimethacrylate, 5,5"-cyclohexylmethylenebis[(1,1'-bicyclohexyl)-2-ol] ethylene oxide adduct dimethacrylate;

cyclohexanedimethanol propylene oxide adduct dimethacrylate, bisphenol A propylene oxide adduct dimethacrylate, hydrogenated bisphenol A propylene oxide adduct dimethacrylate, hydroxybiphenyl propylene oxide adduct dimethacrylate, bisphenol S propylene oxide adduct dimethacrylate, hydrogenated bisphenol S propylene oxide adduct dimethacrylate, bisphenol F propylene oxide adduct dimethacrylate, hydrogenated bisphenol F propylene oxide adduct dimethacrylate, bisphenol P propylene oxide adduct dimethacrylate, hydrogenated bisphenol P propylene oxide adduct dimethacrylate, diphenyl bisphenol A propylene oxide adduct dimethacrylate, diphenyl bisphenol S propylene oxide adduct dimethacrylate, diphenyl bisphenol F propylene oxide adduct dimethacrylate, 5,5"-(1-methylethylidene)bis[(1,1'-bicyclohexyl)-2-ol] propylene oxide adduct dimethacrylate, 4,4'-(1-methylethylidene)bis(2-methylcyclohexanol) propylene oxide adduct dimethacrylate, 5,5"-cyclohexylidenebis[(1,1'-bicyclohexyl)-2-ol] propylene oxide adduct dimethacrylate, and 5,5"-cyclohexylmethylenebis[(1,1'-bicyclohexyl)-2-ol] propylene oxide adduct dimethacrylate.

Among these compounds, cyclohexanedimethanol ethylene oxide adduct diacrylate, bisphenol A ethylene oxide adduct diacrylate, and hydrogenated bisphenol A ethylene oxide adduct diacrylate are preferable.

The radiation curing functional group of the radiation curing compound (2), which is used in combination, is preferably an acrylate. The acrylate is preferably di- or tri-functional. In this range, the coating is less tacky, the curing shrinkage is small, and adequate smoothness can therefore be obtained.

The amount of radiation curing compound (2) added is preferably 10 to 80 wt % based on 100 wt % of the radiation curing compound having a hydroxyl group and a radiation curing functional group. In this range, sufficient adhesion and good smoothness can be obtained.

The viscosity of the radiation curing compound at 25° C. is preferably 20,000 mPa·s or less, and more preferably 3,000 mPa·s or less. When the viscosity is 20,000 mPa·s or less, the smoothness is improved.

In the magnetic recording medium of the present invention the number of magnetic layer surface micro projections having a height, measured by atomic force microscopy (AFM), of 10 to 20 nm is 5 to 1,000 per 100 $(\mu m)^2$ of the surface of the magnetic layer. By providing the above-mentioned radiation-cured material layer the number of projections of the surface of the magnetic layer can be controlled so as to be in the above-mentioned range.

The height measured by atomic force microscopy (AFM) referred to here is defined as the height obtained using as a reference plane a center plane determined by atomic force microscopy (plane for which the volume enclosed by a roughness curve of the magnetic layer surface and the plane is the same above and below the plane and is a minimum).

Therefore, the number of projections having a height of 10 to 20 nm per 100 $(\mu m)^2$ of the surface of the magnetic layer (hereinafter also called PN) means the density of projections, as the total number per 10 μm square, having a height relative to the reference plane of 10 to 20 nm. PN is more preferably 5 to 100/100 $(\mu m)^2$. When the PN is 5 or higher, the coefficient of friction is low, and when the PN is 1,000 or less, the output is high and the number of dropouts (DO) is small, thereby improving the electromagnetic conversion characteristics, which is preferable.

In the magnetic recording medium of the present invention, the radiation-cured layer is formed by coating a non-magnetic support with the radiation curing compound and then exposing the layer thus formed to radiation so as to cure it.

The radiation used in the present invention may be an electron beam or ultraviolet rays. When ultraviolet rays are used, it is necessary to add a photopolymerization initiator to the radiation curing compound. In the case of curing with an electron beam, no polymerization initiator is required, and the electron beam has a deep penetration depth, which is preferable.

With regard to electron beam accelerators that can be used here, there are a scanning system, a double scanning system, and a curtain beam system, and the curtain beam system is preferable since it is relatively inexpensive and gives a high output. With regard to electron beam characteristics, the acceleration voltage is preferably 30 to 1,000 kV, and more preferably 50 to 300 kV, and the absorbed dose is preferably 0.5 to 20 Mrad, and more preferably 2 to 10 Mrad. When the acceleration voltage is 30 to 1,000 kV, the amount of energy penetrating is sufficient, and the efficiency of energy usage in polymerization is high, which is preferable.

The electron beam irradiation atmosphere is preferably controlled by a nitrogen purge so that the concentration of oxygen is 200 ppm or less. When the concentration of oxygen is 200 ppm or less, crosslinking and curing reactions in the vicinity of the surface are not inhibited.

As a light source for the ultraviolet rays, a mercury lamp is preferably used. The mercury lamp is a 20 to 240 W/cm lamp and is preferably used at a speed of 0.3 to 20 m/min. The distance between a substrate and the mercury lamp is generally preferably 1 to 30 cm.

As the photopolymerization initiator used for ultraviolet curing, a radical photopolymerization initiator is used. More particularly, those described in, for example, 'Shinkobunshi Jikkenngaku' (New Polymer Experiments), Vol. 2, Chapter 6 Photo/Radiation Polymerization (Published by Kyoritsu Publishing, 1995, Ed. by the Society of Polymer Science, Japan) can be used.

Specific examples thereof include acetophenone, benzophenone, anthraquinone, benzoin ethyl ether, benzil methyl ketal, benzil ethyl ketal, benzoin isobutyl ketone, hydroxydimethyl phenyl ketone, 1-hydroxycyclohexyl phenyl ketone, and 2,2-diethoxyacetophenone. The mixing ratio of the aromatic ketone is preferably 0.5 to 20 parts by weight relative to 100 parts by weight of the radiation curing compound, more preferably 2 to 15 parts by weight, and yet more preferably 3 to 10 parts by weight.

With regard to the radiation curing equipment, conditions, etc., known equipment and conditions described in 'UV·EB Kokagijutsu' (UV·EB Curing Technology) (1982, published by Sogo Gijutsu Center); 'Teienerugi Denshisenshosha no Oyogijutsu' (Applied Technology of Low-energy Electron Beam Irradiation) (2000, Published by CMC), etc. can be employed.

The thickness of the radiation-cured layer is preferably 0.1 to 1.0 μm. When the thickness is in this range, sufficient smoothness can be achieved and, moreover, the adhesion to the support is good.

The glass transition temperature (Tg) of the radiation-cured layer is preferably 80° C. to 150° C., and more preferably 100° C. to 130° C. When the Tg is in the range of 80° C. to 150° C., the problem of tackiness during coating can be suppressed, and good coating strength can be obtained, which is preferable.

The modulus of elasticity of the radiation-cured layer is preferably 2 to 4 GPa. When the modulus of elasticity is in this range, the problem of the coating being tacky can be suppressed, and good coating strength can be obtained.

2. Magnetic Layer

<Ferromagnetic Fine Powder>

The ferromagnetic fine powder contained in the magnetic layer of the present invention can be either a ferromagnetic metal powder or a ferromagnetic hexagonal ferrite powder.

(Ferromagnetic Metal Powder)

The ferromagnetic metal powder used in the magnetic layer of the present invention is not particularly limited as long as Fe is contained as a main component (including an alloy), and a ferromagnetic alloy powder having α-Fe as a main component is preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. It is preferable for the powder to contain, in addition to a-Fe, at least one chosen from Al, Si, Ca, Y, Ba, La, Nd, Co, Ni and B, and particularly preferably Co, Al, and Y. More specifically, the Co content is preferably 0 to 40 atom % relative to Fe, the Al content is preferably 2 to 20 atom %, and the Y content is preferably 1 to 15 atom %.

These ferromagnetic metal powders may be treated in advance, prior to dispersion, with a dispersant, a lubricant, a surfactant, an antistatic agent, etc. The ferromagnetic metal powder may contain a small amount of water, a hydroxide, or an oxide.

The water content of the ferromagnetic metal powder is preferably set at 0.01% to 2%. The water content of the ferromagnetic metal powder is preferably optimized according to the type of binder (2).

The crystallite size is preferably 8 to 20 nm, more preferably 10 to 18 nm, and particularly preferably 12 to 16 nm. The crystallite size is an average value obtained by the Scherrer method from a half-value width of a diffraction peak obtained using an X-ray diffractometer (RINT2000 manufactured by Rigaku Corporation) with a CuKα1 radiation source, a tube voltage of 50 kV, and a tube current of 300 mA.

The length of the major axis of the ferromagnetic metal powder is preferably 10 to 100 nm, more preferably 30 to 90 nm, and particularly preferably 40 to 80 nm. When the magnetic recording medium of the present invention is played back using a magnetoresistive head (MR head), the length of the major axis of the ferromagnetic metal powder is preferably 60 nm or less. The length of the major axis is determined by the combined use of a method in which a transmission electron microscope photograph is taken and the length of the minor axis and the length of the major axis of the ferromagnetic metal powder are measured directly therefrom, and a method in which a transmission electron microscope photograph is traced by an IBASSI image analyzer (manufactured by Carl Zeiss Inc.) and read off.

The specific surface area obtained by the BET method of the ferromagnetic metal powder used in the magnetic layer of the present invention (hereinafter, 'the specific surface area by the BET method' is also called '$S_{BET}$') is preferably 30 to 80 m$^2$/g, and more preferably 38 to 60 m$^2$/g. This enables both good surface properties and low noise to be achieved at the same time. The pH of the ferromagnetic metal powder is preferably optimized according to the binder (2) used in combination therewith. The pH is preferably in the range of 4 to 12, and more preferably from 7 to 10. The ferromagnetic metal powder may be subjected to a surface treatment with Al, Si, P, or an oxide thereof, if necessary. The amount thereof is usually 0.1 to 10 wt % relative to the ferromagnetic metal powder. The surface treatment can preferably suppress adsorption of a lubricant such as a fatty acid to 100 mg/m$^2$ or below.

The ferromagnetic metal powder may contain soluble inorganic ions such as Na, Ca, Fe, Ni or Sr ions in some cases, and their presence at 200 ppm or below does not particularly affect the characteristics. Furthermore, the ferromagnetic metal powder used in the magnetic layer of the present invention preferably has few pores, and the level thereof is 20 vol % or below, and more preferably 5 vol % or below. The form of the ferromagnetic metal powder may be any of acicular, granular, rice-grain shaped and tabular as long as the above-mentioned requirements for the particle size are satisfied, but it is particularly preferable to use an acicular ferromagnetic metal powder. In the case of the acicular ferromagnetic metal powder, the acicular ratio is preferably 4 to 12, and more preferably 5 to 12.

The coercive force (Hc) of the ferromagnetic metal powder is preferably 143 to 239 kA/m (1,800 to 3,000 Oe), and more preferably 159 to 231 kA/m (2,000 to 2,900 Oe). The saturation magnetic flux density is preferably 150 to 300 T·m (1,500 to 3,000 G), and more preferably 160 to 290 T·m (1,600 to 2,900 G). The saturation magnetization (σs) is preferably 140 to 170 A·m$^2$/kg (emu/g), and more preferably 145 to 160 A·m$^2$/kg (emu/g).

The SFD (switching field distribution) of the magnetic substance is preferably low, and 0.8 or below is preferred. When the SFD is 0.8 or below, the electromagnetic conversion characteristics become good, the output becomes high, the magnetization reversal becomes sharp with a small peak shift, and it is suitable for high-recording-density digital magnetic recording. In order to narrow the Hc distribution, there is a technique of improving the particle distribution of goethite, a technique of using monodispersed α-Fe$_2$O$_3$, and a technique of preventing sintering between particles, etc. in the ferromagnetic metal powder.

The ferromagnetic metal powder can be obtained by a known production method and the following methods can be cited. There are a method in which hydrated iron oxide or iron oxide, on which a sintering prevention treatment has been carried out, is reduced with a reducing gas such as hydrogen to give Fe or Fe—Co particles, a method involving reduction of a composite organic acid salt (mainly an oxalate) with a reducing gas such as hydrogen, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in an inert gas at low pressure, etc. The ferromagnetic metal powder thus obtained can be subjected to a known slow oxidation process. A method in which hydrated iron oxide or iron oxide is reduced with a reducing gas such as hydrogen, and an oxide film is formed on the surface thereof by controlling the partial pressure, temperature, and time of an oxygen-containing gas and an inert gas is preferable since there is little loss of demagnetization.

(Ferromagnetic Hexagonal Ferrite Powder)

Examples of the hexagonal ferrite powder contained in the magnetic layer of the present invention include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. It may contain, in addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, or Zr. In general, those to which Co—Zn, Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The average plate size of the ferromagnetic hexagonal ferrite powder is preferably in the range of 5 to 40 nm, more preferably 20 to 35 nm, and yet more preferably 20 to 30 nm. When a magnetoresistive head (MR head) is used for playback in order to increase the track density, the plate size is preferably 40 nm or smaller so as to reduce noise. If the average plate size is 5 nm or more, stable magnetization can be expected without the influence of thermal fluctuations.

The tabular ratio (plate size/plate thickness) of the ferromagnetic hexagonal ferrite powder is preferably 1 to 15, and more preferably 1 to 7. If the tabular ratio is 1 to 15, good packing and orientation in the magnetic layer are achieved. Furthermore, the noise can desirably be suppressed by inter-particle stacking.

The specific surface area ($S_{BET}$) by the BET method of a powder having a particle size within this range is 10 to 200 m$^2$/g. The specific surface area substantially coincides with the value obtained by calculation using the plate size and the plate thickness. The distribution of the plate size and the plate thickness is preferably as narrow as possible. Though it is difficult, the distribution can be expressed using a numerical value by randomly measuring 500 particles on a TEM photograph of the particles. The distribution is not a regular distribution in many cases, but a standard deviation with respect to the average size is calculated as σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the ferromagnetic hexagonal ferrite powder can be adjusted so as to be on the order of 39.8 to 398 kA/m (500 to 5,000 Oe). A higher coercive force (Hc) is advantageous for high-density recording, but it is restricted by the capacity of the recording head. The coercive force (Hc) in the present invention is on the order of 159 to 239 kA/m (2,000 to 3,000 Oe), and preferably 175 to 223 kA/m (2,200 to 2,800 Oe). When the saturation magnetization of the head exceeds 1.4 T, it is preferably 159 kA/m (2,000 Oe) or higher. The coercive force (Hc) can be controlled by the particle size (plate size, plate thickness), the types and the amount of element included, the element substitution sites, the conditions used for the particle formation reaction, etc. The saturation magnetization σs) is preferably 40 to 80 A·m$^2$/kg (emu/g). A higher saturation magnetization (σs) is preferable, but there is a tendency for it to become lower when the particles become finer. In order to improve the saturation magnetization (σs), making a composite of magnetoplumbite ferrite with spinel ferrite, selecting the types of element included and their amount, etc. is well known. It is also possible to use a W type hexagonal ferrite in the magnetic layer of the present invention.

When dispersing the ferromagnetic hexagonal ferrite powder, the surface of the magnetic particles can be treated with a material that is compatible with a dispersing medium and a polymer. With regard to a surface-treatment agent, an inorganic or organic compound can be used. Representative examples include compounds of Si, Al, P, etc., and various types of silane coupling agents and various kinds of titanate coupling agents. The amount thereof is preferably 0.1% to 10% based on the ferromagnetic hexagonal ferrite powder, and the surface treatment can reduce the adsorption of a lubricant such as a fatty acid to 100 mg/m$^2$ or less. The ferromagnetic hexagonal ferrite powder may contain soluble inorganic ions such as Na, Ca, Fe, Ni or Sr ions in some cases. It is preferable for the soluble inorganic ions to be substantially absent, but their presence at 200 ppm or below does not particularly affect the characteristics.

The pH of the magnetic substance is also important for dispersion. It is usually on the order of 4 to 12, and although the optimum value depends on the dispersing medium and the polymer, it is selected from on the order of 6 to 11 from the viewpoints of chemical stability and storage properties of the medium. The moisture contained in the magnetic substance also influences the dispersion. Although the optimum value depends on the dispersing medium and the polymer, it is usually 0.01% to 2.0%.

With regard to the production method for ferromagnetic hexagonal ferrite powder, there is glass crystallization method (1) in which barium oxide, iron oxide, a metal oxide that replaces iron, and boron oxide, etc. as a glass forming material are mixed so as to give a desired ferrite composition, then melted and rapidly cooled to give an amorphous substance, subsequently reheated, then washed, and ground to give a barium ferrite crystal powder; hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; co-precipitation method (3) in which a barium ferrite composition metal salt solution is neutralized with an alkali, and after a by-product is removed, it is dried and treated at 1100° C. or less, and ground to give a barium ferrite crystal powder, etc., but the production method for ferromagnetic hexagonal ferrite powder of the present invention is not particularly limited and any production method can be used.

<Binder>

Examples of the binder (binder (2)) used in the magnetic layer of the present invention include thermoplastic resins such as a known polyurethane resin and a polymer or a copolymer containing, as a constituent unit, vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc.; thermosetting resins such as a phenol resin, an epoxy resin, a cured polyurethane resin, a urea resin, a melamine resin, an alkyd resin, an acrylic reactive resin, a formaldehyde resin, a silicone resin, an epoxy-polyamide resin, a mixture of a polyester resin and an isocyanate prepolymer, a mixture of a polyester polyol and polyisocyanate, and a mixture of polyurethane and polyisocyanate; reactive resins, and mixtures thereof.

Among them, the polyurethane resin is preferable, and more preferable are a hydrophilic polar group-containing polyurethane resin obtained by reacting a polyol having a molecular weight of 500 to 5,000 and having a cyclic structure and an alkylene oxide chain, such as hydrogenated bisphenol A or a polypropylene oxide adduct of hydrogenated bisphenol A, a polyol having a cyclic structure and a molecular weight of 200 to 500 as a chain extending agent, and an organic diisocyanate; a hydrophilic polar group-containing polyurethane resin obtained by reacting a polyester polyol formed from an aliphatic dibasic acid such as succinic acid, adipic acid, or sebacic acid and an aliphatic diol having a branched alkyl side chain and no cyclic structure such as 2,2-dimethyl-1,3-propanediol, 2-ethyl-2-butyl-1,3-propanediol, or 2,2-diethyl-1,3-propanediol, an aliphatic diol having a branched alkyl side chain having 3 or more carbons such as 2-ethyl-2-butyl-1,3-propanediol or 2,2-diethyl-1,3-propanediol as a chain extending agent, and an organic diisocyanate compound; or a hydrophilic polar group-containing polyurethane resin obtained by reacting an organic diisocyanate with a polyol compound having a cyclic structure and a long alkyl chain, such as dimer diol.

The average molecular weight of the polar group-containing polyurethane resin used in the present invention is preferably 5,000 to 100,000, and more preferably 10,000 to 80,000. When the average molecular weight is 5,000 or more, there are no defects such as the physical strength being degraded; for example, the magnetic coating being brittle, and the durability of the magnetic recording medium can be maintained. Furthermore, when the average molecular weight is 100,000 or less, the solubility and the dispersibility in a solvent can be maintained. Moreover, when the average molecular weight is in the above-mentioned range, an appropriate coating viscosity can be obtained, the workability is good, and the handling is easy.

Examples of the polar group contained in the above-mentioned polyurethane resin include —COOM, —$SO_3M$, —$OSO_3M$, —P=O(OM)$_2$, —O—P=O(OM)$_2$ (wherein M represents a hydrogen atom, or an alkali metal salt), —OH, —$NR_2$, —$N^+R_3$ (R represents a hydrogen atom or a hydrocarbon group), an epoxy group, —SH, and —CN. Polyurethane resins into which at least one of these polar groups has been introduced by copolymerization or an addition reaction can be used. When this polar group-containing polyurethane resin has an OH group, it is preferable for the OH group to be on a side chain from the viewpoint of curability and durability, and the number of OH groups on the side chain is preferably 2 to 40 per molecule, and more preferably 3 to 20 per molecule. The polar group content is $10^{-1}$ to $10^{-8}$ mol/g, and preferably from $10^{-2}$ to $10^{-6}$ mol/g.

Examples of the polyisocyanate that can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-tolidine diisocyanate, isophorone diisocyanate, and triphenylmethane triisocyanate; products from these isocyanates and a polyalcohol; and polyisocyanates formed by condensation of an isocyanate. Product names of these isocyanates that are commercially available are Coronate L, Coronate HL, Coronate 2030, Coronate 2031, Millionate MR, Millionate MTL (Nippon Polyurethane Industry Co., Ltd.), Takenate D-102, Takenate D-110N, Takenate D-200, Takenate D-202 (Takeda Chemical Industry Ltd.), Desmodur L, Desmodur IL, Desmodur N Desmodur HL (Sumitomo Bayer Urethane Co., Ltd.), etc., and they can be used singly or in a combination of two or more while taking into consideration the difference in curing reactivity for each layer.

Specific examples of the binder (2) include VAGH, VYHH, VMCH, VAGF, VAGD, VROH, VYES, VYNC, VMCC, XYHL, XYSG, PKHH, PKHJ, PKHC and PKFE (manufactured by Union Carbide Corporation), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Denki Kagaku Kogyo Kabushiki Kaisha), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Industry Co., Ltd.), Pandex T-5105, T-R3080 and T-5201, Burnock D-400, D-210-80, Crisvon 6109 and 7209 (manufactured by Dainippon Ink and Chemicals, Incorporated), Vylon UR8200, UR8300, UR8700, RV530 and RV280 (manufactured by Toyobo Co., Ltd.), Daiferamine 4020, 5020, 5100, 5300, 9020, 9022 and 7020 (manufactured by Dainichiseika Color & Chemicals Mfg. Co., Ltd.), MX5004 (manufactured by Mitsubishi Chemical Corp.), Sanprene SP-150 (manufactured by Sanyo Chemical Industries, Ltd.), and Saran F310 and F210 (manufactured by Asahi Kasei Corporation).

The amount of binder used in the magnetic layer of the present invention is in the range of 5 to 50 wt %, and preferably 10 to 30 wt %, based on 100 wt % of the ferromagnetic fine powder. When a polyurethane resin is used, the amount thereof is 2 to 20 wt %, the amount of polyisocyanate is 2 to 20 wt %, and they are preferably used in combination, but if, for example, head corrosion is caused by a slight degree of dechlorination, it is possible to use a polyurethane alone or a combination of a polyurethane and an isocyanate alone. As another resin, when a vinyl chloride resin is used, the amount thereof is 5 to 30 wt %. When a polyurethane is used in the present invention, the polyurethane preferably has a glass transition temperature of −50° C. to 150° C., and more preferably 0° C. to 100° C., an elongation at break of 100% to 2,000%, a breaking stress of 0.49 to 98 MPa (0.05 to 10 kg/mm$^2$), and a yield point of 0.49 to 98 MPa (0.05 to 10 kg/mm$^2$).

With regard to the binder used in the present invention, the amount thereof added, the contents of the vinyl chloride resin, polyurethane resin, polyisocyanate or other resin contained in the binder, the molecular weight of each of the resins forming the magnetic layer, the polar group content, and the physical properties of the resins, etc. can of course be varied in the non-magnetic layer and the magnetic layer as necessary, but it is better if these factors are optimized individually for the respective layers, and known techniques relating to multiple magnetic layers can be employed. For example, when the amount of binder is varied among the layers, increasing the amount of binder contained in the magnetic layer is effective in reducing scratches on the surface of the magnetic layer. For the purpose of improving head contact, the amount of binder in the middle layer can be increased, thereby imparting flexibility.

The magnetic layer of the present invention can contain an additive as necessary. Examples of the additive include an abrasive, a lubricant, a dispersant/dispersion adjuvant, an anti-mold agent, an antistatic agent, an antioxidant, a solvent, and carbon black.

Examples of these additives are as follows.

Molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether, and aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof.

Alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof; aromatic phosphates such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof; and alkyl sulphonates and alkali metal salts thereof.

Fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, oleic acid, linoleic acid, linolenic acid, elaidic acid, or erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc.

Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid, a phosphoric acid, or a sulfate ester group; and an amphoteric surfactant such as an amino acid, an aminosulfonic acid, a sulfate ester or a phosphate ester of an amino alcohol, or an alkylbetaine. Details of these surfactants are described in 'Kaimenkasseizai Binran (Surfactant Handbook)' (published by Sangyo Tosho Publishing).

The dispersant, lubricant, etc. need not always be pure and may contain, in addition to the main component, an impurity such as an isomer, an unreacted material, a byproduct, a decomposed product, or an oxide. However, the impurity content is preferably 30 wt % or below, and more preferably 10 wt % or below.

Specific examples of these additives include NAA-102, hardened castor oil fatty acids, NAA42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd), Enujelv OL (produced by New Japan Chemical Co., Ltd.), TA-3 (produced by Shin-Etsu Chemical Industry Co., Ltd.), Armide P (produced by Lion Armour), Duomin TDO (produced by Lion Corporation), BA41G (produced by The Nisshin Oil Mills, Ltd.), Profan 2012E, Newpol PE 61, and Ionet MS-400 (produced by Sanyo Chemical Industries, Ltd.).

An organic solvent used for the magnetic layer of the present invention can be a known organic solvent. As the organic solvent, a ketone such as acetone, methyl ethyl ketone, methyl isobutyl ketone, diisobutyl ketone, cyclohexanone, isophorone, or tetrahydrofuran, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, cresol, or chlorobenzene, a chlorohydrocarbon such as methylene chloride, ethylene chloride, carbon tetrachloride, chloroform, ethylene chlorohydrin, or dichlorobenzene, N,N-dimethylformamide, hexane, etc. can be used at any ratio.

These organic solvents do not always need to be 100% pure, and may contain an impurity such as an isomer, an unreacted compound, a by-product, a decomposed product, an oxide, or moisture in addition to the main component. The content of these impurities is preferably 30% or less, and more preferably 10% or less. The organic solvent used in the present invention is preferably the same type for both the magnetic layer and the middle layer. However, the amount added may be varied. The coating stability is improved by using a high surface tension solvent (cyclohexanone, dioxane, etc.) for the middle layer; more specifically, it is important that the arithmetic mean value of the surface tension of the magnetic layer solvent composition is not less than that for the surface tension of the middle layer solvent composition. In order to improve the dispersibility, it is preferable for the polarity to be somewhat strong, and the solvent composition preferably contains at least 50% of a solvent having a permittivity of 15 or higher. The solubility parameter is preferably 8 to 11.

The type and the amount of the dispersant, lubricant, and surfactant used in the magnetic layer of the present invention can be changed as necessary in the magnetic layer and the middle layer, which will be described later. For example, although not limited to only the examples illustrated here, the dispersant has the property of adsorbing or bonding via its polar group, and it is surmised that the dispersant adsorbs or bonds, via the polar group, to mainly the surface of the ferromagnetic fine powder in the magnetic layer and mainly the surface of the non-magnetic powder in the middle layer, which will be described later, and once adsorbed it is hard to desorb an organophosphorus compound from the surface of metal, a metal compound, etc. Therefore, since in the present invention the surface of the ferromagnetic fine powder or the surface of the non-magnetic powder, which will be described later, are in a state in which they are covered with an alkyl group, an aromatic group, etc., the affinity of the ferromagnetic fine powder or the non-magnetic powder toward the binder resin component increases and, furthermore, the dispersion stability of the ferromagnetic fine powder or the non-magnetic powder is also improved.

With regard to the lubricant, since it is present in a free state, its exudation to the surface is controlled by using fatty acids having different melting points for the middle layer and the magnetic layer or by using esters having different boiling points or polarity. The coating stability can be improved by regulating the amount of surfactant added, and the lubrication effect can be improved by increasing the amount of lubricant added to the middle layer. All or a part of the additives used in the present invention may be added to magnetic layer or middle layer coating solutions at any stage of their preparation. For example, an additive may be blended with a ferromagnetic fine powder before a kneading step; it may be added during a kneading step involving the ferromagnetic fine powder, a binder, and a solvent; it may be added during a dispersing step; it may be added after the dispersing step; or it may be added immediately before coating.

The magnetic layer in the present invention can contain carbon black as necessary.

The carbon black used in the magnetic layer has a specific surface area of 5 to 500 m$^2$/g, and preferably 50 to 400 m$^2$/g, and preferably an oil absorption obtained using dibutyl phthalate (DBP) (hereinafter, 'DBP oil absorption' means an oil absorption obtained using dibutyl phthalate) of 10 to 400 ml/100 g, and more preferably 30 to 200 ml/100 g. The particle size of the carbon black is preferably 5 to 300 nm, more preferably 10 to 200 nm, and yet more preferably 20 to 100 nm. The carbon black preferably has a pH of 2 to 10, a water content of 0.1 to 10 wt %, and a tap density of 0.1 to 1 g/ml.

Specific examples of the carbon black include BLACK-PEARLS 2000, 1300, 1000, 900, 905, 800, 880, and 700, and VULCAN XC-72 (manufactured by Cabot Corporation), #3950B, #3750B, #3250B, #3150B, #3050B, #2400B, #2300, #1000 #970B, #950, #900, #850B, #650B, #40, #30, #10B, and MA-600 (manufactured by Mitsubishi Chemical Corporation), CONDUCTEX SC, RAVEN8800, 8000, 7000, 5750, 5250, 3500, 2100, 2000, 1800, 1500, 1255, 1250, 150, 50, 40, 15, and MT-P (manufactured by Columbia Carbon Co.), and Ketjen Black EC (manufactured by Nippon EC).

The carbon black may be subjected to any of a surface treatment with a dispersant, etc., grafting with a resin, or a partial surface graphitization. The carbon black may be used singly or in a combination of different types thereof. The carbon black is preferably used in an amount of 0.1 to 30 wt % based on the amount of the magnetic substance. The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for the magnetic layer according to the intended purpose on the basis of the above-mentioned various properties such as the particle size, the oil absorption, the electroconductivity and the pH value, but it is better if they are optimized for the respective layers.

3. Middle Layer

A non-magnetic powder contained in the middle layer can be selected from inorganic compounds such as a metal oxide, a metal carbonate, a metal sulfate, a metal nitride, a metal carbide, and a metal sulfide.

As examples of the inorganic compound, α-alumina with an α component proportion of 90% to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. can be used singly or in combination. Particularly preferable are titanium dioxide, zinc oxide, iron oxide and barium sulfate, and more preferable is titanium dioxide.

The average particle size of such a non-magnetic powder is preferably 0.005 to 2 µm, but it is also possible, as necessary, to combine non-magnetic powders having different particle sizes or widen the particle size distribution of a single non-magnetic powder, thus producing the same effect. The particle size of the non-magnetic powder is particularly preferably 0.01 to 0.2 µm.

The pH of the non-magnetic powder is particularly preferably 6 to 9.

The specific surface area ($S_{BET}$) by the BET method of the non-magnetic powder is preferably 1 to 100 m$^2$/g, more preferably 5 to 80 m$^2$/g, and yet more preferably 7 to 60 m$^2$/g.

The crystallite size of the non-magnetic powder is preferably 0.01 to 2 µm.

The DBP oil absorption is preferably 5 to 100 ml/100 g, more preferably 10 to 80 ml/100 g, and yet more preferably 20 to 60 ml/100 g.

The specific gravity is 1 to 12, and preferably 3 to 6.

The form may be any one of acicular, spherical, polyhedral, and tabular.

The surface of the non-magnetic powder is preferably subjected to a surface treatment so that $Al_2O_3$, $SiO_2$, $TiO_2$, $ZrO_2$, $SnO_2$, $Sb_2O_3$, or ZnO is present. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-precipitation, or a method can be employed in which the surface is firstly treated with alumina and the surface thereof is then treated with silica, or vice versa. The surface-treated layer may be formed as a porous layer depending on the intended purpose, but it is generally preferable for it to be uniform and dense.

Incorporation of carbon black into the middle layer can give the known effects of a lowering of Rs, and giving a desired micro Vickers hardness. Because of this, furnace black for rubber, thermal black for rubber, carbon black for coloring, acetylene black, etc. can be used. The specific surface area of the carbon black is preferably 100 to 500 $m^2/g$, and more preferably 150 to 400 $m^2/g$, and the DBP oil absorption thereof is preferably 20 to 400 ml/100 g, and more preferably 30 to 200 ml/100 g. The average particle size of the carbon black is preferably 5 to 80 nm (mμ), more preferably 10 to 50 nm (mμ), and yet more preferably 10 to 40 nm (mμ). The pH of the carbon black is preferably 2 to 10, the water content thereof is preferably 0.1% to 10%, and the tap density is preferably 0.1 to 1 g/ml.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbia Carbon Co.), and Ketjen Black EC (manufactured by Akzo).

As a binder (binder (1)), lubricant, dispersant, additive, solvent, dispersing method, etc. for the middle layer, those for the magnetic layer can be employed. In particular, the amount and the type of binder, and the amounts and types of additive and dispersant can be determined according to known techniques regarding the magnetic layer.

A non-magnetic coating solution prepared using the above-mentioned materials is applied to a non-magnetic support so as to form a middle layer.

4. Non-magnetic Support

With regard to the non-magnetic support that can be used in the present invention, known biaxially stretched films such as polyethylene naphthalate, polyethylene terephthalate, polyamide, polyimide, polyamideimide, aromatic polyamide, and polybenzoxidazole can be used. Polyethylene naphthalate and aromatic polyamide are preferred. These non-magnetic supports can be subjected in advance to a corona discharge treatment, a plasma treatment, a treatment for enhancing adhesion, a thermal treatment, etc. The non-magnetic support that can be used in the present invention preferably has a surface having excellent smoothness such that its center line average surface roughness is in the range of 0.1 to 20 nm for a cutoff value of 0.25 mm, and preferably 1 to 10 nm. Furthermore, these non-magnetic supports preferably have not only a small center line average surface roughness but also no coarse projections with a height of 1 μm or higher.

5. Layer Arrangement

The magnetic recording medium of the present invention has a multilayer structure having, on a non-magnetic support, a radiation-cured layer, a middle layer as necessary, and at least one magnetic layer.

When the upper magnetic layer is a single layer, the thickness thereof is preferably 0.05 to 1.0 μm, and more preferably 0.05 to 0.5 μm. When the thickness of the upper magnetic layer is in the above-mentioned range, a magnetic layer having high smoothness and mechanical strength can be obtained.

When the upper magnetic layer comprises a plurality of magnetic layers, the thickness of the uppermost magnetic layer is desirably 0.05 to 1.0 μm, and preferably 0.05 to 0.5 μm, and the overall thickness of the upper magnetic layer is desirably 1.0 to 2.5 μm, and preferably 1.0 to 1.5 μm. When the layer structure of the magnetic layer is in the above-mentioned range, a magnetic layer having high smoothness and mechanical strength can be obtained.

The process for producing the magnetic recording medium of the present invention is for example carried out by coating the surface of a non-magnetic support while it is moving with a lower layer coating solution, and subsequently or simultaneously with a magnetic coating solution so that the magnetic layer has a dry thickness of the above-mentioned preferred magnetic layer thickness and the lower layer preferably has a dry thickness of 1.0 to 2.0 μm, and more preferably 1.0 to 1.5 μm.

As coating equipment for applying the above-mentioned magnetic coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used. With regard to these, for example, 'Saishin Kotingu Gijutsu (Latest Coating Technology)' (May 31, 1983) published by Sogo Gijutsu Center can be referred to.

As examples of the coating equipment and the coating method for the magnetic recording medium of the present invention, the following can be proposed.

(1) A lower layer is firstly applied by coating equipment such as gravure, roll, blade, or extrusion coating equipment, which is generally used for coating with a magnetic coating solution, and before the lower layer has dried an upper layer is applied by a pressurized support type extrusion coating device such as one disclosed in JP-B-1-46186, JP-A-60-238179, or JP-A-2-265672 (JP-A denotes a Japanese unexamined patent application publication).

(2) Upper and lower layers are substantially simultaneously applied by means of one coating head having two slits for a coating solution to pass through, such as one disclosed in JP-A-63-88080, JP-A-2-17971, or JP-A-2-265672.

(3) Upper and lower layers are substantially simultaneously applied by means of an extrusion coating device with a backup roll, such as one disclosed in JP-A-2-174965.

The surface of the non-magnetic support used in the present invention that has not been coated with the magnetic coating solution may be provided with a back layer (backing layer). The back layer is usually a layer provided by coating the surface of the non-magnetic support that has not been coated with the magnetic coating solution with a back layer-forming coating solution in which a particulate component such as an abrasive or an antistatic agent and a binder have been dispersed in an organic solvent. An adhesive layer may be provided on the surfaces of the non-magnetic support that are to be coated with the magnetic coating solution and the backcoat layer-forming coating solution. The coated layer of the magnetic coating solution thus applied is dried after subjecting the ferromagnetic fine powder contained in the coated layer of the magnetic coating solution to a magnetic field alignment treatment.

After drying is carried out in this way, it is preferable to subject the coated layer to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic fine powder in the magnetic layer, and a magnetic recording medium having high electromagnetic conversion characteristics can thus be obtained. With regard to calendering rolls, rolls of a heat-resistant plastic such as epoxy, polyimide, polyamide, or polyamideimide are used. It is also possible to treat with metal rolls, which is desirable and preferable.

The magnetic recording medium of the present invention preferably has a magnetic layer whose surface has a center line average roughness in the range of 0.1 to 4 nm for a cutoff value of 0.25 mm, and preferably 1 to 3 nm, which is extremely smooth. As a method therefor, a magnetic layer formed by selecting a specific ferromagnetic fine powder and binder as described above is subjected to the above-mentioned calendering treatment. The magnetic recording medium thus obtained can be used by cutting into a desired size by means of a cutter, etc.

In accordance with the present invention, a magnetic recording medium having excellent transport durability, coating smoothness, electromagnetic conversion characteristics, and long-term storability can be obtained.

EXAMPLES

The present invention is explained specifically below with reference to examples, but the examples should not be construed to limit the present invention. 'Parts' in the Examples denotes 'parts by weight'.

Example 1

Preparation of Magnetic Layer Coating Solution 100 parts of a ferromagnetic alloy powder (composition: Fe 89 atm %, Co 5 atm %, Y 6 atm %, Hc 159.2 kA/m$^2$ (2,000 Oe), crystallite size 15 nm, $S_{BET}$ 59 m$^2$/g, major axis length 0.04 μm, acicular ratio 7, σs 150 A·m$^2$/kg (emu/g)) was ground in an open kneader for 10 minutes, subsequently 10 parts (solids content) of an SO$_3$Na-containing polyurethane solution (solids content 30%, SO$_3$Na content 70 μeq/g, weight-average molecular weight 80,000) was added thereto, and 30 parts of cyclohexanone was further added thereto, and the mixture was kneaded for 60 minutes.

Subsequently,

| | |
|---|---|
| an abrasive (Al$_2$O$_3$ particle size 0.3 μm) | 2 parts, |
| carbon black (particle size 40 nm) | 2 parts, and |
| methyl ethyl ketone/toluene = 1/1 | 200 parts | were added thereto, and the mixture was dispersed in a sand mill for 120 minutes,

| | |
|---|---|
| butyl stearate | 2 parts, |
| stearic acid | 1 part, and |
| methyl ethyl ketone | 50 parts | were further added thereto, the mixture was stirred and mixed for a further 20 minutes, and filtered using a filter having an average pore size of 1 μm to give a magnetic coating solution.

Subsequently, the surface of a polyethylene terephthalate support having a thickness of 7 μm and a center plane average surface roughness Ra of 6.2 nm was coated with a 30 wt % solution (MEK solution) of the radiation curing compound having the composition ratio shown in Table 1 by a coiled bar so that the dry thickness thereof was 0.5 μm, dried, and cured by irradiating the coating surface with an electron beam at an acceleration voltage of 150 kV and an absorbed dose of 5 Mrad.

Subsequently, the top of the radiation-cured layer was simultaneously coated by reverse roll with a magnetic coating solution so that the dry thickness thereof was 0.5 μm. Before the magnetic coating solution had dried, it was subjected to magnetic field alignment using a 5,000 G Co magnet and a 4,000 G solenoid magnet, and after the solvent was removed by drying, it was subjected to a calender treatment employing a metal roll-metal roll-metal roll-metal roll-metal roll-metal roll-metal roll combination (speed 100 m/min, line pressure 300 kg/cm, temperature 90° C.) and then slit to a width of ½ inch to give a magnetic tape of Example 1.

Examples 2 to 11 and Comparative Examples 1 to 7

Magnetic tapes were prepared in the same manner as in Example 1 except that the radiation curing compounds shown in Table 1 were used.

Example 12

Preparation of Middle Layer Non-magnetic Coating Solution 100 parts of α-Fe$_2$O$_3$ (average particle size 0.15 μm, $S_{BET}$ 52 m$^2$/g, surface-treated with Al$_2$O$_3$ and SiO$_2$, pH 6.5 to 8.0) was ground in an open kneader for 10 minutes, subsequently 15 parts (solids content) of an SO$_3$Na-containing polyurethane solution (solids content 30%, SO$_3$Na content 70 μeq/g, weight-average molecular weight 80,000) was added thereto, 30 parts of cyclohexanone was further added thereto, and the mixture was kneaded for 60 minutes.

Subsequently,

| | |
|---|---|
| methyl ethyl ketone/cyclohexanone = 6/4 | 200 parts | was added thereto, and the mixture was dispersed in a sand mill for 120 minutes.

To this mixture,

| | |
|---|---|
| butyl stearate | 2 parts, |
| stearic acid | 1 part, and |
| methyl ethyl ketone | 50 parts | were added and the mixture was stirred and mixed for a further 20 minutes, and filtered using a filter having an average pore size of 1 μm to give a middle layer coating solution.

Subsequently, the surface of a polyethylene terephthalate support having a thickness of 7 μm and a center plane average surface roughness Ra of 6.2 nm was coated with a 30 wt % solution (MEK solution) of the radiation curing compound shown in Table 1 by a coiled bar so that the dry thickness thereof was 0.5 μm, dried, and cured by irradiating the coating surface with an electron beam at an acceleration voltage of 150 KV and an absorbed dose of 5 Mrad.

Subsequently, the top of the radiation-cured layer was coated with the non-magnetic coating solution, on top of which was further applied the magnetic coating solution by simultaneous reverse roll multilayer coating so that the dry thicknesses thereof were 1.5 μm and 0.1 μm respectively. Before the magnetic coating solution had dried, it was subjected to magnetic field alignment using a 5,000 G Co magnet and a 4,000 G solenoid magnet, and after the solvent was removed by drying, it was subjected to a calender treatment employing a metal roll-metal roll-metal roll-metal roll-metal roll-metal roll-metal roll-metal roll combination (speed 100 m/min, line pressure 300 kg/cm, temperature 90° C.) and then slit to a width of ½ inch to give a magnetic tape of Example 12.

Example 13 and Comparative Examples 8 and 9

Magnetic tapes were prepared in the same manner as in Example 12 except that the radiation curing compounds shown in Table 1 were used.

The radiation curing compounds used in Examples 1 to 13 and Comparative Example 1 to 9 are shown below.

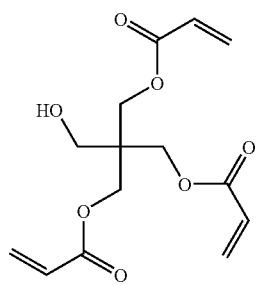

Compound A: Pentaerythritol triacrylate

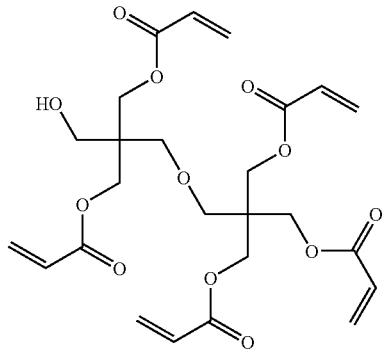

Compound B: Dipentaerythritol pentaacrylate

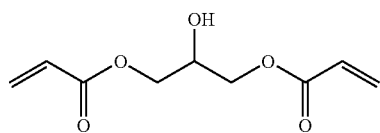

Compound C: Glycerol diacrylate

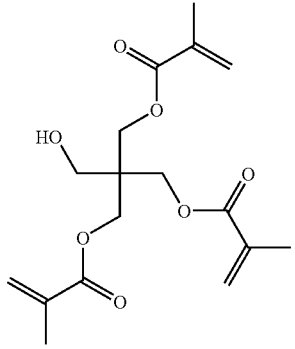

Compound D: Pentaerythritol trimethacrylate

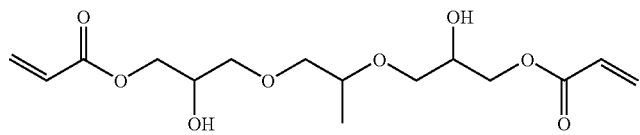

Compound E: Propylene glycol diglycidyl ether diacrylate

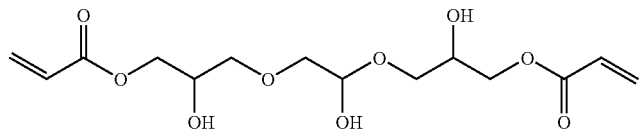

Compound F: Glycerol diglycidyl ether diacrylate

-continued

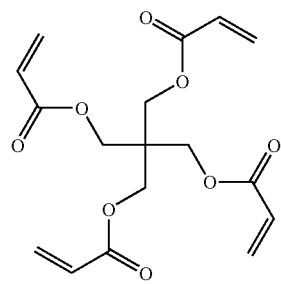

Compound G: Pentaerythritol tetraacrylate

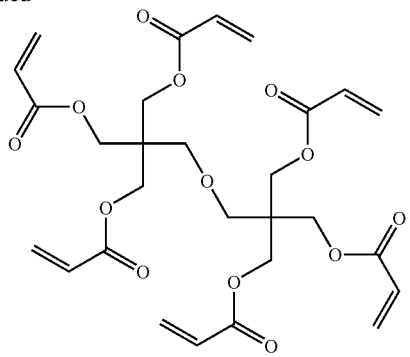

Compound H: Dipentaerythritol hexaacrylate

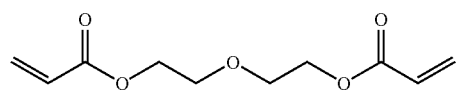

Compound I: Diethylene glycol diacrylate

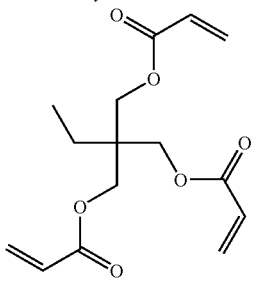

Compound J: Trimethylolpropane triacrylate

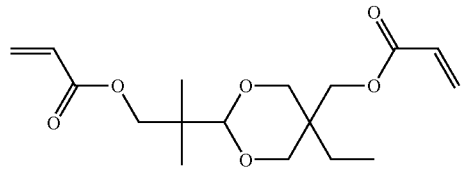

Compound K: 5-Ethyl-2-(2-hydroxy-1,1-dimethylethyl)-5-(hydroxymethyl)-1,3-dioxane diacrylate

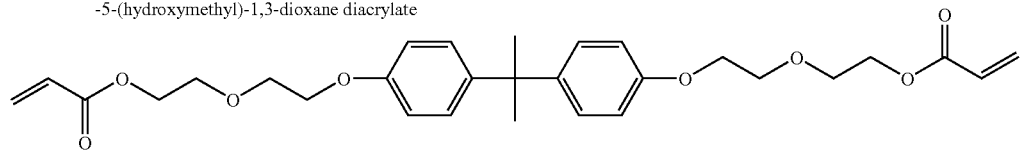

Compound L: Bisphenol A ethylene oxide (4 mole) adduct diacrylate

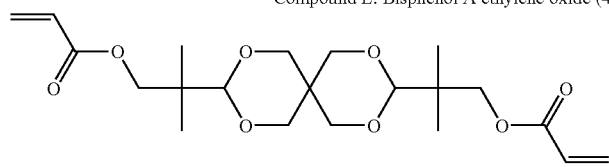

Compound M: 3,9-Bis(1,1-dimethyl-2-hydroxyethyl)-2,4,8,10-tetraoxaspiro[5.5]undecane diacrylate Measurement Methods (1) Number of Micro Projections The number of projections per 10 μm square (100 (μm)$^2$) was measured at every 5 nm up to a height of 20 nm using a Nanoscope III (AFM: atomic force microscope) manufactured by Digital Instruments with a four-sided pyramidal SiN probe having a tip angle of 70°.

(2) Electromagnetic Conversion Characteristics

A recording head (MIG gap 0.15 μm, 1.8T) and an MR playback head were mounted in a drum tester and measurement was carried out.

The playback output when the relative speed of the head and the medium was 1 to 3 m/min and the surface recording density was 0.57 Gbit/inch$^2$ was measured and expressed as a relative value where the playback output of Comparative Example 1 was 0 dB.

(3) Adhesion

Pressure-sensitive adhesive tape was affixed to the surface of the magnetic layer and peeled off at 180°.

Excellent: no peel-off of the magnetic layer.

Good: although the magnetic layer peeled off, the test sample still had magnetic layer remaining.

Poor: no magnetic layer remained on the test sample.

(4) Repetitive Transport Properties

The surface of a magnetic layer was placed in contact with an SUS 420 member at 50° C. and 20% RH with a load of 50g and, after repetitively passing 800 times at 2 mm/sec, the surfaces of the member and the magnetic layer were inspected by a differential interference optical microscope and evaluated using the criteria below.

Excellent: no scratches on the magnetic layer, no attachment of magnetic layer to the member.
Good: some scratches on the magnetic layer, but no attachment of the magnetic layer to the member.
Poor: some scratches on the magnetic layer and attachment of the magnetic layer to the member (5) Tackiness Problem A radiation-cured layer was applied, and adhesion to a path roller was examined visually.
Some: adhered to the path roller.
None: did not adhere to the path roller.

The measurement results are given in Table 1.

What is claimed is:

1. A magnetic recording medium comprising:
   a non-magnetic support and, in order thereon
   a radiation-cured layer formed by curing a layer containing a radiation curing compound by exposure to radiation; and
   at least one magnetic layer having a ferromagnetic powder dispersed in a binder (2);
   the radiation curing compound having a hydroxyl group and a radiation curing functional group in the molecule; and
   the magnetic layer having on the surface thereof a number of micro projections having a height of 10 to 20 nm measured by atomic force microscopy (AFM) of 5 to 1,000/100 $(\mu m)^2$,
   wherein the radiation curing compound comprises a radiation curing compound (1) having 1 to 3 hydroxyl groups and 2 to 5 acryloyl groups or methacryloyl groups and a radiation curing compound (2) having a

TABLE 1

| | Radiation curing compound of radiation-cured layer | Number of projections (counts) | Electromagnetic conversion characteristics (dB) | Adhesion | Repetitive transport durability | Tackiness problem |
|---|---|---|---|---|---|---|
| Example 1 | Compound A alone | 7 | 1.5 | Excellent | Excellent | None |
| Example 2 | Compound B/ Compound K = 40/60 | 700 | 0.7 | Excellent | Excellent | None |
| Example 3 | Compound C/ Compound K = 40/60 | 50 | 1.1 | Excellent | Excellent | None |
| Example 4 | Compound D/ Compound K = 40/60 | 15 | 1.3 | Excellent | Excellent | None |
| Example 5 | Compound E/ Compound K = 40/60 | 150 | 0.8 | Excellent | Excellent | None |
| Example 6 | Compound F/ Compound K = 40/60 | 350 | 1 | Excellent | Excellent | None |
| Example 7 | Compound A/ Compound K = 40/60 | 25 | 1 | Excellent | Excellent | None |
| Example 8 | Compound A/ Compound L = 40/60 | 30 | 1.1 | Excellent | Excellent | None |
| Example 9 | Compound A/ Compound M = 40/60 | 15 | 1.3 | Excellent | Excellent | None |
| Example 10 | Compound A/ Compound K = 20/80 | 10 | 1.5 | Excellent | Excellent | None |
| Example 11 | Compound A/ Compound K = 60/40 | 150 | 0.7 | Excellent | Excellent | None |
| Example 12 | Compound A alone | 5 | 1.5 | Excellent | Excellent | None |
| Example 13 | Compound A/ Compound K = 40/60 | 10 | 1.2 | Excellent | Excellent | None |
| Comparative Example 1 | Compound G alone | 1300 | 0 | Poor | Poor | None |
| Comparative Example 2 | Compound H/ Compound K = 40/60 | 1200 | 0.1 | Poor | Poor | None |
| Comparative Example 3 | Compound I/ Compound K = 40/60 | 560 | 1 | Good | Good | Some |
| Comparative Example 4 | Compound J/ Compound K = 40/60 | 1100 | 0.2 | Poor | Poor | None |
| Comparative Example 5 | Compound G/ Compound K = 40/60 | 1100 | 0.1 | Poor | Poor | None |
| Comparative Example 6 | Compound G/ Compound L = 40/60 | 1150 | 0.1 | Good | Good | Some |
| Comparative Example 7 | Compound G/ Compound M = 40/60 | 1200 | 0.2 | Poor | Poor | None |
| Comparative Example 8 | Compound G alone | 1250 | 0.1 | Poor | Poor | None |
| Comparative Example 9 | Compound G/ Compound K = 40/60 | 1100 | 0 | Poor | Poor | None | cyclic structure, an ether group, and two or more radiation curing functional groups in the molecule.

2. The magnetic recording medium according to claim 1, wherein the medium has at least one middle layer between the radiation-cured layer and the magnetic layer, the middle layer having a non-magnetic powder dispersed in a binder (1).

3. The magnetic recording medium according to claim 1, wherein the radiation curing compound (2) has an acryloyl group as a radiation curing functional group.

4. The magnetic recording medium according to claim 1, wherein the medium contains 10 wt % to 80 wt % of the radiation curing compound (2) relative to 100 wt % of the radiation curing compound (1).

5. The magnetic recording medium according to claim 1, wherein the ferromagnetic powder is a ferromagnetic metal powder.

6. The magnetic recording medium according to claim 1, wherein the ferromagnetic powder is a ferromagnetic hexagonal ferrite powder.

7. The magnetic recording medium according to claim 2, wherein the binder (1) and/or the binder (2) comprise a polyurethane resin.

8. The magnetic recording medium according to claim 1, wherein the radiation curing functional group is an acryloyl group and/or a methacryloyl group.

9. The magnetic recording medium according to claim 1, wherein the radiation-cured layer and/or the middle layer contain carbon black.

10. The magnetic recording medium according to claim 1, wherein the radiation-cured layer has a thickness of 0.1 to 1.0 µm.

11. The magnetic recording medium according to claim 1, wherein the magnetic layer has a thickness of 0.05 to 1.0 µm.

12. The magnetic recording medium according to claim 1, wherein the middle layer has a thickness of 1.0 to 2.0 µm.

13. The magnetic recording medium according to claim 2, wherein the magnetic layer is a single layer, the thickness thereof being 0.05 to 0.5 µm.

14. The magnetic recording medium according to claim 2, wherein the magnetic layer is a single layer, the thickness thereof being 0.05 to 0.1 µm.

15. The magnetic recording medium according to claim 1, wherein the magnetic layer comprises an antistatic agent such as carbon black.

* * * * *